(12) United States Patent
Soroushian et al.

(10) Patent No.: US 9,485,456 B2
(45) Date of Patent: Nov. 1, 2016

(54) FRAME-RATE CONVERSION IN A DISTRIBUTED COMPUTING SYSTEM

(71) Applicant: Akamai Technologies, Inc., Cambridge, MA (US)

(72) Inventors: Kourosh Soroushian, San Diego, CA (US); Robert O. Eifrig, San Jose, CA (US); Nikolay Topilski, San Diego, CA (US)

(73) Assignee: Akamai Technologies, Inc., Cambridge, MA (US)

( * ) Notice: Subject to any disclaimer, the term of this patent is extended or adjusted under 35 U.S.C. 154(b) by 294 days.

(21) Appl. No.: 14/143,340

(22) Filed: Dec. 30, 2013

(65) Prior Publication Data

US 2015/0189225 A1 Jul. 2, 2015

(51) Int. Cl.
H04N 7/01 (2006.01)

(52) U.S. Cl.
CPC .................. *H04N 7/0127* (2013.01)

(58) Field of Classification Search
CPC .............. H04L 67/10; H04N 7/0127
USPC ..................... 375/240.02; 348/459
See application file for complete search history.

(56) References Cited

U.S. PATENT DOCUMENTS

| | | | |
|---|---|---|---|
| 5,751,360 | A | 5/1998 | Tanaka et al. |
| 5,935,207 | A | 8/1999 | Logue et al. |
| 6,011,868 | A | 1/2000 | van den Branden et al. |
| 6,108,703 | A | 8/2000 | Leighton et al. |
| 6,233,392 | B1 | 5/2001 | Comer |
| 6,466,624 | B1 | 10/2002 | Fogg |
| 6,480,537 | B1 | 11/2002 | Agrawal et al. |
| 6,570,926 | B1 | 5/2003 | Agrawal et al. |
| 6,662,329 | B1 | 12/2003 | Foster et al. |

(Continued)

FOREIGN PATENT DOCUMENTS

| | | |
|---|---|---|
| WO | WO0159706 A1 | 8/2001 |
| WO | WO0169936 A2 | 9/2001 |

OTHER PUBLICATIONS

Jokhio et al. "Bit Rate Reduction Video Transcoding with Distributed Computing". 2012 20th Euromicro International Conference on Parallel, Distributed and Network-based Processing. 2012, pp. 206-212.*

(Continued)

*Primary Examiner* — Christopher S Kelley
*Assistant Examiner* — Zhihan Zhou

(57) ABSTRACT

Described herein are, among other things, distributed processing methods and systems for frame rate conversion. In an embodiment, a transcoding management machine manages a distributed transcoding process, creating a plurality of video segments and assigning the video segments across a set of distributed transcoding resources for frame rate conversion. The management machine typically sends a given segment to a given transcoding resource along with instructions to convert the frame rate to a specified output frame rate. In addition, the management machine can send certain transcoding assistance information that preferably facilitates the frame rate change process and helps the transcoding resource to create a more accurate output segment. Hence, in some embodiments, each transcoding resource can perform its transcode job independently, but with reference to the input segment it is responsible for transcoding and the assistance information provided by the management machine.

31 Claims, 14 Drawing Sheets

(56) References Cited

U.S. PATENT DOCUMENTS

| | | | |
|---|---|---|---|
| 6,924,809 B2 | 8/2005 | Chao et al. | |
| 7,035,332 B2 | 4/2006 | He et al. | |
| 7,111,057 B1 | 9/2006 | Sherman et al. | |
| 7,127,713 B2 | 10/2006 | Davis et al. | |
| 7,240,100 B1 | 7/2007 | Wein et al. | |
| 7,293,093 B2 | 11/2007 | Leighton et al. | |
| 7,296,082 B2 | 11/2007 | Leighton et al. | |
| 7,376,716 B2 | 5/2008 | Dilley et al. | |
| 7,472,178 B2 | 12/2008 | Lisiecki et al. | |
| 7,590,739 B2 | 9/2009 | Swildens et al. | |
| 7,596,619 B2 | 9/2009 | Leighton et al. | |
| 7,693,959 B2 | 4/2010 | Leighton et al. | |
| 7,787,539 B2 | 8/2010 | Chen et al. | |
| 7,818,444 B2 | 10/2010 | Brueck et al. | |
| 8,325,821 B1* | 12/2012 | Kizhepat | H04N 21/234345 375/240.26 |
| 8,385,413 B2 | 2/2013 | Chen | |
| 8,542,748 B2 | 9/2013 | Zhao et al. | |
| 2001/0040926 A1 | 11/2001 | Hannuksela et al. | |
| 2002/0066007 A1 | 5/2002 | Wise et al. | |
| 2003/0016751 A1 | 1/2003 | Vetro et al. | |
| 2003/0043923 A1 | 3/2003 | Zhang et al. | |
| 2003/0132955 A1 | 7/2003 | Le Floch et al. | |
| 2003/0158913 A1 | 8/2003 | Agnoli et al. | |
| 2003/0202594 A1 | 10/2003 | Lainema et al. | |
| 2004/0093419 A1 | 5/2004 | Weihl et al. | |
| 2004/0218673 A1 | 11/2004 | Wang et al. | |
| 2004/0237097 A1 | 11/2004 | Covell et al. | |
| 2004/0255328 A1 | 12/2004 | Baldwin et al. | |
| 2005/0013376 A1 | 1/2005 | Dattani et al. | |
| 2005/0031218 A1 | 2/2005 | Berkner et al. | |
| 2005/0036551 A1 | 2/2005 | Winger et al. | |
| 2005/0105618 A1 | 5/2005 | Booth et al. | |
| 2005/0190872 A1 | 9/2005 | Seong et al. | |
| 2005/0232497 A1 | 10/2005 | Yogeshwar et al. | |
| 2005/0276329 A1 | 12/2005 | Adiletta et al. | |
| 2006/0156219 A1 | 7/2006 | Haot et al. | |
| 2006/0222078 A1 | 10/2006 | Raveendran | |
| 2006/0236221 A1 | 10/2006 | McCausland et al. | |
| 2006/0256860 A1 | 11/2006 | Gordon et al. | |
| 2007/0058718 A1 | 3/2007 | Shen et al. | |
| 2007/0058730 A1 | 3/2007 | Bowra et al. | |
| 2007/0116369 A1 | 5/2007 | Zandi et al. | |
| 2007/0166006 A1 | 7/2007 | Mizukami et al. | |
| 2007/0179927 A1 | 8/2007 | Vaidyanathan et al. | |
| 2007/0230568 A1 | 10/2007 | Eleftheriadis et al. | |
| 2008/0037656 A1 | 2/2008 | Hannuksela et al. | |
| 2008/0091845 A1 | 4/2008 | Mills et al. | |
| 2008/0195743 A1 | 8/2008 | Brueck et al. | |
| 2009/0074052 A1 | 3/2009 | Fukuhara et al. | |
| 2009/0083811 A1 | 3/2009 | Dolce | |
| 2009/0083813 A1 | 3/2009 | Dolce | |
| 2009/0310669 A1 | 12/2009 | Konoshima et al. | |
| 2010/0131674 A1 | 5/2010 | Vecchio et al. | |
| 2010/0218227 A1 | 8/2010 | Frink | |
| 2010/0218231 A1 | 8/2010 | Frink | |
| 2010/0246676 A1 | 9/2010 | Cao et al. | |
| 2011/0051806 A1 | 3/2011 | Lee et al. | |
| 2011/0069756 A1 | 3/2011 | Matthews et al. | |
| 2011/0107185 A1 | 5/2011 | Grube et al. | |
| 2011/0173345 A1 | 7/2011 | Knox et al. | |
| 2011/0228848 A1 | 9/2011 | Dvir et al. | |
| 2011/0280311 A1 | 11/2011 | Chen et al. | |
| 2011/0280316 A1 | 11/2011 | Chen et al. | |
| 2011/0285557 A1 | 11/2011 | Korodi et al. | |
| 2011/0296048 A1 | 12/2011 | Knox et al. | |
| 2012/0014433 A1 | 1/2012 | Karczewicz et al. | |
| 2012/0057631 A1 | 3/2012 | Le Leannec et al. | |
| 2012/0075436 A1 | 3/2012 | Chen et al. | |
| 2012/0076203 A1 | 3/2012 | Sugimoto et al. | |
| 2012/0236940 A1 | 9/2012 | Katzur et al. | |
| 2012/0259942 A1 | 10/2012 | Brookins et al. | |
| 2012/0265853 A1 | 10/2012 | Knox et al. | |
| 2012/0331089 A1 | 12/2012 | Vonog et al. | |
| 2013/0114744 A1 | 5/2013 | Mutton | |
| 2013/0117418 A1 | 5/2013 | Mutton et al. | |
| 2013/0272374 A1* | 10/2013 | Eswaran | H04L 65/602 375/240.02 |
| 2014/0032658 A1* | 1/2014 | Falls | H04N 21/234309 709/204 |
| 2014/0140417 A1* | 5/2014 | Shaffer | H04N 21/8456 375/240.28 |
| 2014/0185667 A1* | 7/2014 | McPhillen | H04N 19/00472 375/240.03 |
| 2014/0351455 A1* | 11/2014 | McCormick | H04L 65/601 709/248 |

OTHER PUBLICATIONS

U.S. Appl. No. 12/981,676, available in IFW.

The Apache Software Foundation, Apache ZooKeeper Home Page, Copyright 2010, 2 pages, (available at http://zookeeper.apache.org). Downloaded on Oct. 7, 2015.

Internet Archive WaybackMachine, Apache ZooKeeper Home Page, Jan. 2, 2011, 2 pages, (available at https://web.archive.org/web/20110102153613/http://zookeeper.apache.org/). Downloaded on Oct. 7, 2015.

The Apache Software Foundation, Apache ZooKeeper Releases, Copyright 2010, 6 pages, (available at http://zookeeper.apache.org/releases.html). Downloaded on Oct. 7, 2015.

The Apache Software Foundation, Apache ZooKeeper Releases 3-3-1: A Distributed Coordination Service for Distributed Application, last published on Dec. 15, 2010, Copyright 2008, 7 pages, (available at http://zookeeper.apache.org/doc/r3.1.1/zookeeperOver.html). Downloaded on Oct. 7, 2015.

The Apache Software Foundation, Apache ZooKeeper, Releases 3-3-3: A Distributed Coordination Service for Distributed Application, last published on Feb. 28, 2011, Copyright 2008, 7 pages, (available https://zookeeper.apache.org/doc/r3.3.3./zookeeperOver.html). Downloaded on Oct. 7, 2015.

U.S. Appl. No. 13/667,267, Non-Final Office Action mailed on Apr. 10, 2015, 28 pages.

Khan et al., Architecture Overview of MediaNet Multiprocessor Transcoder, Technical Report Aug. 1, 2000, Kent State University, 2000, 4 pages.

Gonzalez et al., DVD Transcoding With Linux Metacomputing, Linux Journal, 2003, 19 pages.

Sambe et al., Distributed Video Transcoding and its Application to Grid Delivery, The 9th Asia-Pacific Conference on Communications, Sep. 2003, vol. 1, pp. 98-102.

Sambe et al., High Speed Distributed Video Transcoding for Multiple Rates and Formats, IECE Trans. Inf. & Syst. vol. E88-D, No. 8, Aug. 2005, pp. 1923-1931.

U.S. Appl. No. 13/667,272 (available in IFW).

U.S. Appl. No. 13/667,267 (available in IFW).

Jokhio, Fareed et al., Abo Akademi Univ., "Bit Rate Reduction Video Transcoding with Distributed Computing" presentation, dated Feb. 16, 2012, prepared for 20th Euromicro Int'l Conference on Parallel, Distributed and Network based Processing, Feb. 15-17, 2012 in Garching, Germany, 19 pages.

Lin, Yi-Wei et al., "Repeat-Frame Selection Algorithm for Frame Rate Video Transcoding", Int'l Journal of Image Processing, vol. 3, Issue 6, Jan. 2010, pp. 341-352 (available at http://www.cscjournals.org/csc/journals/IJIP/archive.php?JCode=IJIP).

Wayback Archive of Aug. 19, 2009 for "Zencoder—How It Works," at https://web.archive.org/web/ 20090819120639/http://zencoder.tv/how, downloaded Apr. 25, 2016, 1 page.

Wayback Archive of Aug. 26, 2009 for "Zencoder Features," at https://web.archive.org/web/20090826062411/http://zencoder.tv/features, downloaded Apr. 25, 2016, 2 pages.

Wayback Archive of Dec. 6, 2009 for "On Demand Video Encoding\ Complete Features Description," at https://web.archive.org/web/20091206040020/ http://www.encoding.com/features, downloaded Apr. 25, 2016, 2 pages.

Wayback Archive of Jan. 7, 2010 for "On Demand Video Encoding," at https://web.archive.org/web/ 20100107202032/ http://www.encoding.com, downloaded Apr. 25, 2016, 2 pages.

(56) References Cited

OTHER PUBLICATIONS

Wayback Archive of Jul. 21, 2009 for "Encoding.com Documentation: The XML API Overview," at https://web.archive.org/web/20090721235302/ http://www.encoding.com/wdocs/ApiDoc, downloaded Apr. 25, 2016, 11 pages.
Wayback Archive of Mar. 23, 2009 for "Encoding.com Documentation: VBScript sample," at https://web.archive.org/web/20090323071709/http://www.encoding.com/wdocs/SampleScripts, downloaded Apr. 25, 2016, 5 pages.
Wayback Archive of Oct. 19, 2009 for "On Demand Video Encoding \The Encoding.com XML API," at https://web.archive.org/web/20091019035726/ http://www.encoding.com/api, downloaded Apr. 25, 2016, 2 pages.
Wayback Archive of Sep. 1, 2010 for "Encoding.com Documentation: VBScript sample," at https://web.archive.org/web/20100901221229/ http://www.encoding.com/wdocs/SampleScripts, downloaded Apr. 25, 2016, 6 pages.
Wayback Archive of Sep. 21, 2010 for "Integration Libraries « Zencoder Docs," at https://web.archive.org/web/20100921225521/http://zencoder.com/integration-libraries, downloaded Apr. 25, 2016, 2 pages.
Wayback Archive of Sep. 24, 2010 for "Video Encoding/Transcoding/Converting Web Service | Zencoder," at https://web.archive.org/web/20100924061831/http://zencoder.com/, downloaded Apr. 25, 2016, 3 pages.
Wayback Archive of Sep. 26, 2010 for "API—Zencoder Docs," at https://web.archive.org/web/20100926160832/http://zencoder.com/docs/api, downloaded Apr. 25, 2016, 21 pages.
Wayback Archive of Sep. 27, 2010 for "Getting Started—Zencoder Docs," at https://web.archive.org/web/20100927052335/http://zencoder.com/docs, downloaded Apr. 25, 2016, 2 pages.
Wayback Archive of Sep. 1, 2010 for "Encoding.com Documentation: The XML API Overview," at https://web.archive.org/web/20100901232958/ http://www.encoding.com/wdocs/ApiDoc, downloaded Apr. 25, 2016, 15 pages.
Wayback Archive of Sep. 1, 2010 for "On Demand Video Encoding \ Complete Features Description," at https://web.archive.org/web/20100901201409/ http://www.encoding.com/features, downloaded Apr. 25, 2016, 2 pages.
Wayback Archive of Sep. 1, 2010 for "On Demand Video Encoding \The Encoding.com XML API," at https://web.archive.org/web/20100901215237/ http://www.encoding.com/api, downloaded Apr. 25, 2016, 2 pages.
Wayback Archive of Sep. 13, 2010 for "On Demand Video Encoding," at https://web.archive.org/web/ 20100913110311/ http://www.encoding.com, downloaded Apr. 25, 2016, 2 pages.
Wayback Archive of Sep. 18, 2009 for "Video Transcoding Software \ Zencoder," at https://web.archive.org/web/20090918230413/http://zencoder.tv/, downloaded Apr. 25, 2016, 2 pages.
"Wayback Archive of Aug. 30, 2009 for "Zencoder, Learn Our REST API," at https://web.archive.org/web/20090830051526/http://zencoder.tv/apidocs, downloaded Apr. 25, 2016, 6 pages."
Amazon, 2008 AWS StartUp Challenge Finalists \ AWS Blog, Nov. 7, 2008, web page available at https://aws.amazon.com/blogs/aws/2008awsstartupchallengefinalists/, downloaded Apr. 25, 2016, 6 pages.

* cited by examiner

Transcoding Resource 401

Transcoding Resource 402

FRAME-RATE CONVERSION IN A DISTRIBUTED COMPUTING SYSTEM

CROSS REFERENCE TO RELATED APPLICATIONS

This patent document contains material which is subject to copyright protection. The copyright owner has no objection to the facsimile reproduction by anyone of the patent document or the patent disclosure, as it appears in Patent and Trademark Office patent files or records, but otherwise reserves all copyright rights whatsoever.

BACKGROUND

1. Technical Field

This disclosure relates generally to distributed data processing systems and more particularly to frame rate conversion, sometimes referred to as temporal transcoding, of video content in distributed data processing environments.

2. Brief Description of the Related Art

Content providers (such as large-scale broadcasters, film distributors, and the like) generally want to distribute their content online in a manner that complements traditional mediums such as broadcast TV (including high definition television) and DVD. It is important to them to have the ability to distribute content to a wide variety of third-party client application/device formats, and to offer a quality viewing experience regardless of network conditions, using modern technologies like adaptive bitrate streaming. Notably, since Internet-based content delivery is no longer limited to fixed line environments such as the desktop, and more and more end users now use wireless devices to receive and view content, the ability to support new client device formats and new streaming technologies is particularly important.

A given content provider's content might represent single-media content (e.g., audio file) or the media file may include multiple media types, i.e., a container file with audio/video data. Generally speaking, a given container file is built on elemental data, potentially leveraging several different formats. For example, the audio and video data are each encoded using appropriate codecs, which are algorithms that encode and compress that data. Example codecs include H.264, VP6, AAC, MP3, etc. A container or package format functions as a wrapper and describes the data elements and metadata of various multimedia, so that a client application knows how to play it. Example container formats include FLV, Silverlight, MP4, PIFF, and MPEG-TS.

A given multimedia stream may reflect a variety of settings used to create the stream, e.g., bitrate encoding, formatting, packaging and other settings. Several versions of a given stream may be necessary for technologies like adaptive bitrate streaming, in order to allow a client or a server to switch between streams to compensate for network congestion or other issues.

Hence, to support the distribution of content to a wide variety of devices, content providers typically must create many different versions of their content. This can be done by transcoding content to change an encoding parameter or container format (the latter often being referred to as transmuxing or remultiplexing). The bit rate may also be changed, a process often referred to as transrating. This allows, for example, the creation of multiple copies of a given movie title at different screen sizes, bit rates, and client player formats.

The conversion of content can be achieved using a single machine, sometimes referred to as a linear approach, in which one machine processes the entire file. Alternatively content can be converted using a parallel approach, also referred to as a distributed approach, in which typically a given content file is broken into multiple segments or chunks, which are each processed by separate machines in a distributed computing architecture.

For example, U.S. Patent Publication No. 2013-0117418, titled "Hybrid Platform For Content Delivery and Transcoding", the teachings of which are hereby incorporated by reference, discloses a system in which machines in a content delivery network (CDN) are configured to perform transcoding in parallel. The CDN described there is a distributing processing system and has many CDN machines. The CDN machines are designated as transcoding resources; a given content file is broken into segments (sometimes referred to as 'streamlets') which are distributed to various machines to be transcoded separately, along with instructions and parameters for the transcoding job. Once the machines return the transcoded content, the segments can be reassembled to create the transcoded content file. U.S. Patent Publication No. 2013-0114744, titled "Segmented Parallel Encoding With Frame-Aware, Variable-Size Chunking," the teachings of which are hereby incorporated by reference, discloses techniques for breaking a given video into segments.

In addition to the conversion functions described previously, it is desirable to have a parallel architecture perform frame-rate conversion for a video, which is sometimes referred to as "temporal transcoding." For example, it may be desired to either up-convert or down-convert the frame rate in a given stream.

However, frame rate conversion in a distributed architecture is challenging. The transcoding resources are operating in parallel, but some frame rate conversion decisions (such as when to remove or insert a frame) cross segment boundaries. Also, some videos have jitter in their timestamps, causing slight variations at segment boundaries. And, group-of-picture (GoP) structures in the video stream can vary widely and be quite complex.

FIGS. 1-2 illustrate some of the challenges present in a distributed transcoding approach. FIG. 1 shows a set of hypothetical input video segments that are 6 frames long (for a total of 24 frames) and are being down-converted to a total of 15 frames. The frames are denoted by the numbered vertical lines. The frames are shown in presentation time stamp (PTS) order. In a single-transcoder (linear) system, there would be no boundary conditions because a single transcoder processes all input and output frames.

Therefore, in a linear transcoding approach, frame-rate conversion would simply follow the input frame sequence to create an output sequence with uniform inter-frame spacing. However, in the distributed approach, each transcoding resource generally processes the segments independently; hence the boundary parameters such as t1 and t2 in FIG. 1 must be independently calculated to accurately maintain frame-time distances across the boundaries once all of the individual segments are multiplexed back together.

FIG. 2 further highlights the challenges of the distributed approach by illustrating the frame-rate conversion situation at each transcoding resource. FIG. 2 illustrates that each transcoding resource (TR) may need to produce a different number of output frames for its given segment. Further, FIG. 2 illustrates the need for each transcoding resource to employ the proper starting and ending offset times t1, t2, or otherwise the frame timing of the output segment might be negatively impacted.

FIG. 3 illustrates input frame timing jitter. The top stream is the example input sequence and the bottom is the output sequence with corrected timing. The ideal timing is indicated by the crossed lines 301 and some deviation of the frames from this ideal timing can be seen, for example, around frames 6 and 12.

The small amount of jitter in the input sequence of FIG. 3 may not be noticeable when the sequence is played back, and it may not be significant enough to impact audio-video synchronization. By the end of the sequence, all frames may again be aligned with the ideal frame times, as shown in FIG. 3. However, the small amount of jitter nevertheless might impact frame-rate conversion in a distributed transcoding system. For example, looking at frame 6 of the input, we can see that due to jitter problems, this frame has been pushed to segment 2 instead of being a part of segment 1. The actual duration of frame 5, however, will be the difference between frames 6 and 5, and hence, the overall length of segment 1 will be slightly larger than the ideal frame timing.

In a distributed approach, the transcoding resource processing segment 1 is not aware that frame 6 should have actually been a part of segment 1, and instead may proceed to perform an additional frame duplication of input frame 5 to create output frame 6, which technically fits within its time boundary. Hence, now there may be two frames representing output frame 6—one from a duplication of frame 5, and second from the actual input frame 6 in segment 2.

In light of these kinds of issues, there is a need to provide systems, apparatus, and methods for frame-rate conversion in distributed transcoding architectures. The teachings herein address these needs and offer other features and benefits that will become apparent in view of this disclosure.

SUMMARY

Described herein are, among other things, methods and systems for frame rate conversion in a distributed processing environment. In an embodiment, a transcoding management machine manages a distributed transcoding process, creating a plurality of video segments and assigning the video segments across a set of distributed transcoding resources for frame rate conversion. The management machine typically sends a given segment to a given transcoding resource along with instructions to change the frame rate to a specified output frame rate.

In addition, the management machine can send certain transcoding assistance information for the assigned segment, which is typically timing information about the video that the transcoding resource might otherwise not know. Such information preferably facilitates the frame rate conversion process and helps the transcoding resource to create a more accurate output segment, as described herein. Preferably, then, each transcoding resource can perform its transcode job independently, but with reference to the input segment it is responsible for transcoding and the assistance information provided by the management machine.

The transcoding management machine, upon receiving various output segments returned from the distributed transcoding resources, can reassemble the complete transcoded stream at the new frame rate.

The foregoing description merely refers to particular examples of the invention for purposes of overview and illustration. It is not limiting and the teachings hereof may be realized in a variety of systems, methods, apparatus, and non-transitory computer-readable media. It should also be noted that the allocation of functions to particular machines is not limiting, as the functions recited herein may be combined or split amongst different machines in a variety of ways.

The subject matter described herein has a variety of applications in content delivery and online platform architectures, including in distributed transcoding systems such as those implemented in a CDN and otherwise.

BRIEF DESCRIPTION OF THE DRAWINGS

The subject matter of this document will be more fully understood from the following detailed description taken in conjunction with the accompanying drawings, in which.

DETAILED DESCRIPTION

The following description sets forth embodiments of the invention to provide an overall understanding of the principles of the structure, function, manufacture, and use of the methods and apparatus disclosed herein. The systems, methods and apparatus described herein and illustrated in the accompanying drawings are non-limiting examples; the claims alone define the scope of protection that is sought. The features described or illustrated in connection with one exemplary embodiment may be combined with the features of other embodiments. Such modifications and variations are intended to be included within the scope of the present invention. All patents, publications and references cited herein are expressly incorporated herein by reference in their entirety. The term "e.g." is used herein as an abbreviation for the non-limiting phrase "for example."

Introduction

In one embodiment, a distributed processing system for frame rate conversion (sometimes referred to as temporal transcoding) is provided. Conventional distributed transcoding techniques may be employed to break or chunk a given video into a plurality of segments, which are sometimes referred to as streamlets. Preferably the segments are non-overlapping. The segments can be distributed to various transcoding resource machines along with instructions specifying the desired output frame rate. The individual transcoding resource machines perform the desired transcode on their assigned segment, and return it to a management machine that reassembles the transcoded segments into a whole at the new frame rate.

Figure 1:
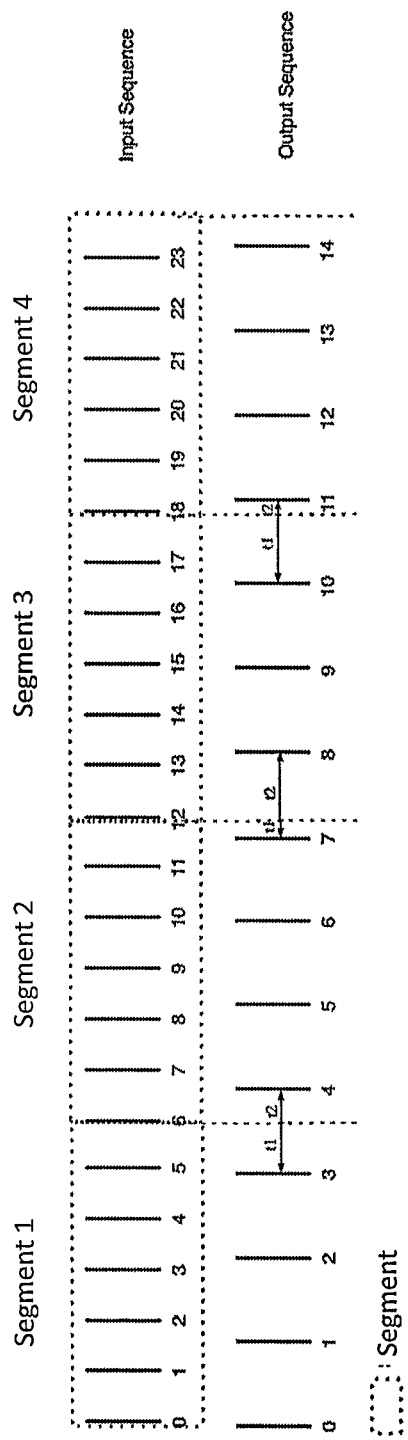
FIG. 1 is a schematic diagram illustrating an example sequence of input frames, allocated to particular segments, and a sequence of output frames following a frame-rate down-conversion.
Figure 2:
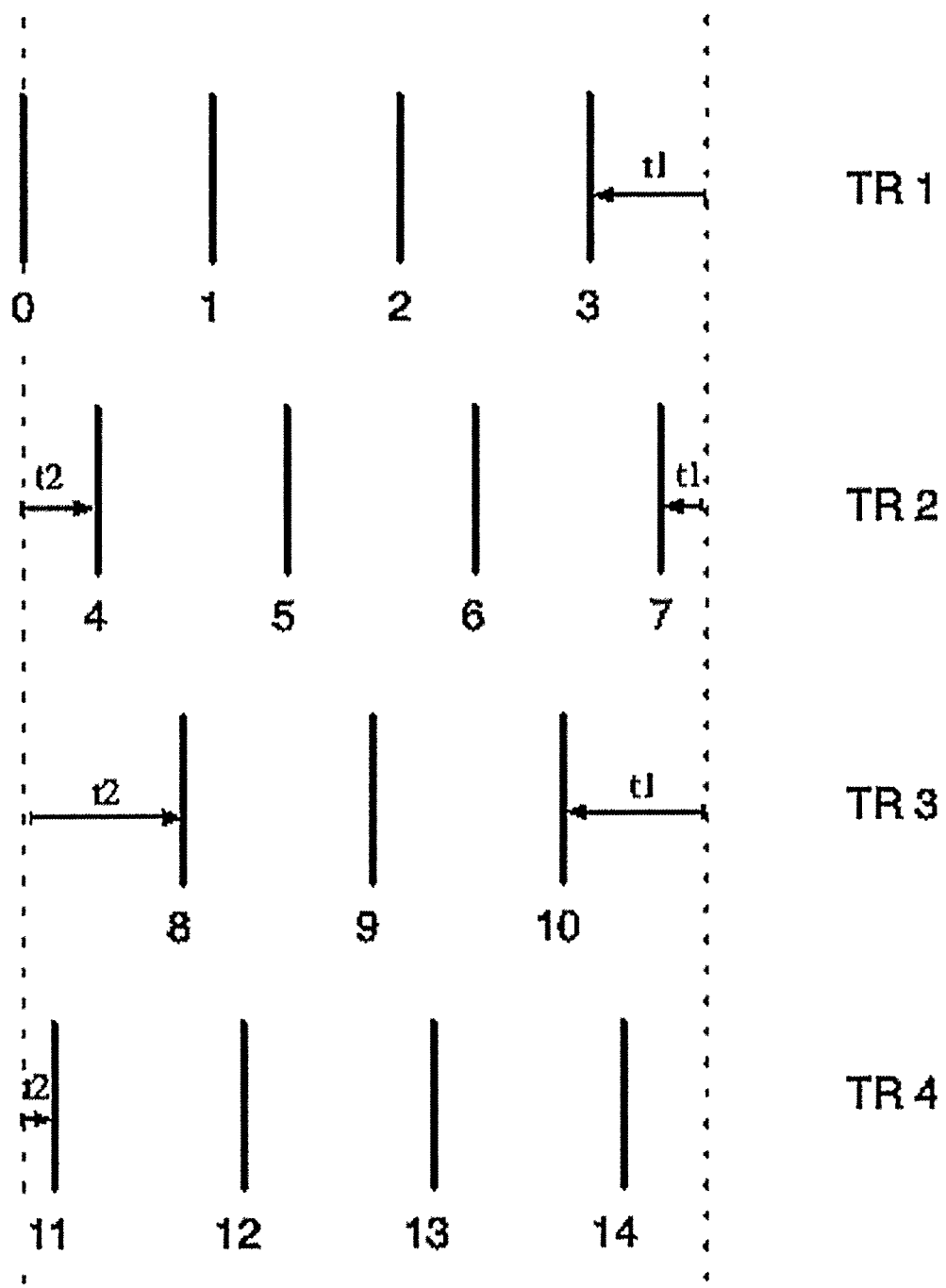
FIG. 2 is a schematic diagram illustrating the example sequence of output frames from FIG. 1 on a segment by segment basis.
Figure 3:
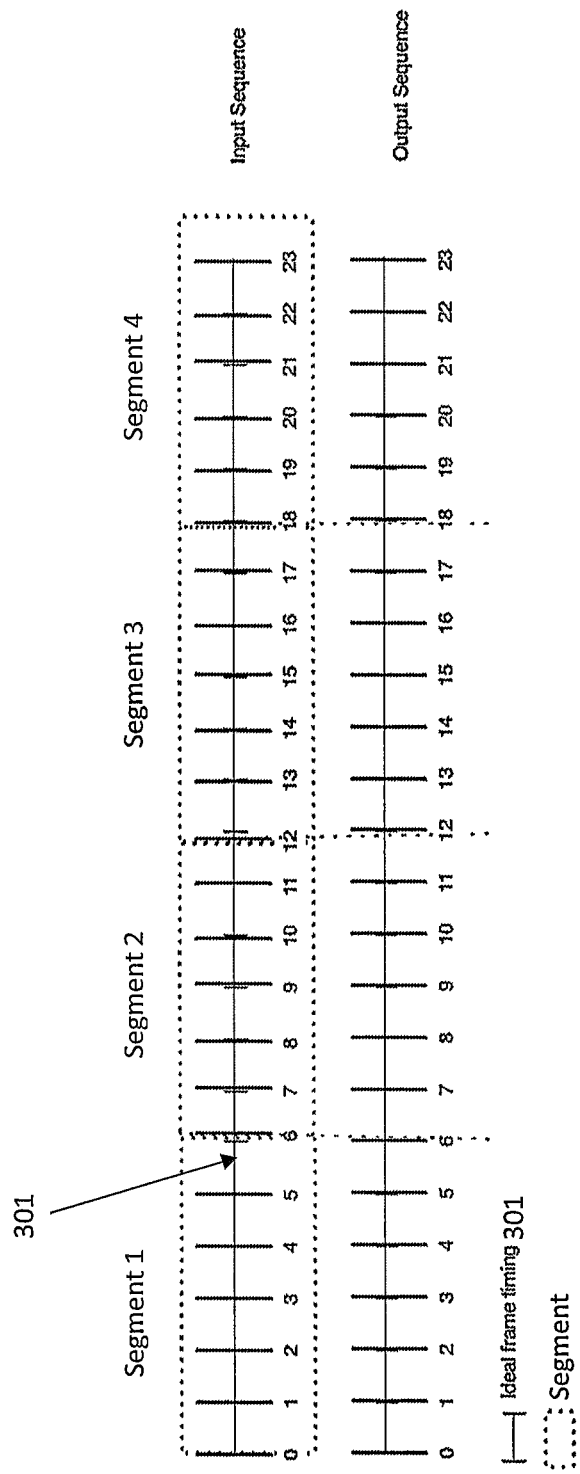
FIG. 3 is a schematic diagram illustrating an input sequence with input frame timing jitter and an output sequence in which the timing jitter has been mitigated.
Figure 4:
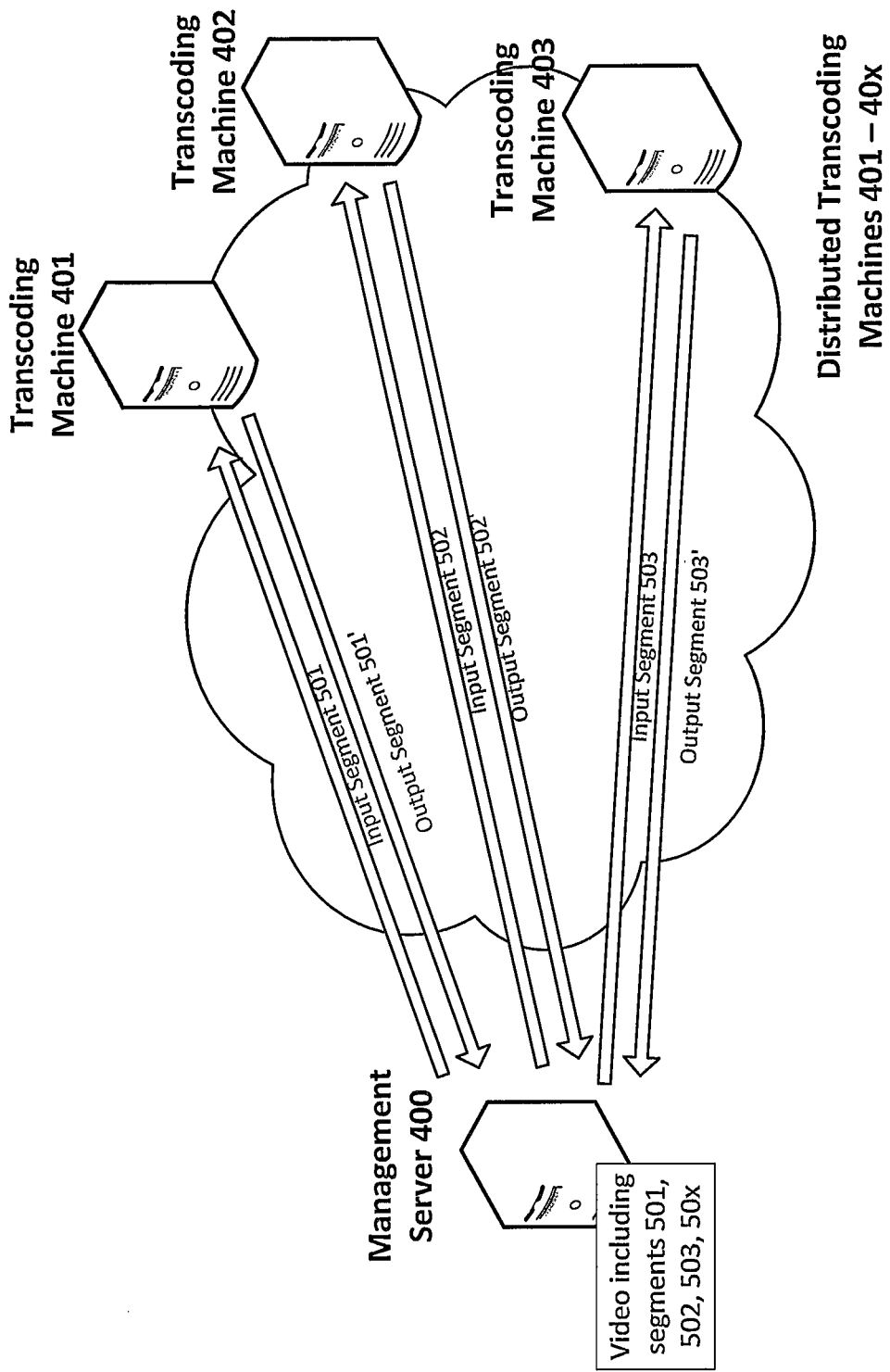
FIG. 4 is a schematic diagram generally illustrating one embodiment of a distributed transcoding system.

Preferably, the distributed transcoding resources work independently and leverage certain transcoding assistance information provided to them with their transcoding job, so as to improve the frame-rate conversion process and output quality. FIG. 4 is a high-level diagram of a distributed transcoding architecture in which management machine 400 manages the process of temporally transcoding a particular file or stream, breaking it into segments (preferably non-overlapping). The management machine 400 also assigns the segments across a set of remote and distributed transcoding resources that will each perform part the transcode independently. In FIG. 4, the set of transcoding resources is represented by machines 401-403 and more generally any number of machines 401-40x may be employed, as of course the number and distribution of machines (both management and transcoding resource machines) may vary with the particular desired implementation goals.

Typically, the management machine 400 sends a given segment to an assigned transcoding resource, such as transcoding resource 401, with instructions and parameters specifying that the transcoding resource 401 should change the frame rate of its segment 501 to a given output frame rate. The management machine 400 also sends the assigned transcoding resource 401 certain transcoding assistance information for segment 501. The management machine 400 does likewise for transcoding resource 402 and segment 502, and so on.

Preferably, the assistance information provided by the management machine 400 is timing information, and in particular certain time stamps.

For example, one time stamp can represent a reference point in the video, such as the beginning of the sequence of segments in the video. For example, the first time stamp can be the presentation time stamp of the initial frame of the video to be transcoded. Other reference points are possible and are described further below.

A second time stamp is preferably associated with the initial frame of the next segment in the video—that is, the segment in the stream immediately following the particular segment that is being assigned and sent by the management machine 400. Preferably, though without limitation, this time stamp is the presentation time stamp of that initial frame of the 'next' segment. Put another way, the presentation time stamp for the 'next' frame in the video following the assigned segment is determined and sent. Preferably the management machine 400 extracts this time stamp and sends it to the transcoding resource 40x as part of the aforementioned assisting information, so that the next segment itself does not have to be sent.

Upon receiving the segment with the frame-rate change instructions and assistance information, the assigned transcoding resource machine 40x can use the assistance information to create an output segment with the proper frame timing and placement, thus converting the frame rate. Various intermediate calculations and decisions about how to produce the output segment may occur and are described in more detail below. The assigned transcoding resource 40x creates an output segment at the desired frame rate based on the input segment and the assistance information, and returns the output segment to the transcoding management machine 400. As noted previously, the transcoding management machine 400 can reassemble the complete file or stream at the changed frame rate.

The transcoding management machine 400 and transcoding resource machines 401-40x may be machines in content delivery network, as described in U.S. Patent Publication No. 2013-0117418, titled "Hybrid Platform For Content Delivery and Transcoding", the teachings of which are hereby incorporated by reference, and in U.S. Patent Publication No. 2013-0114744, titled "Segmented Parallel Encoding With Frame-Aware, Variable-Size Chunking," the teachings of which are hereby incorporated by reference.

Transcoding Assistance Information

Figure 5A:
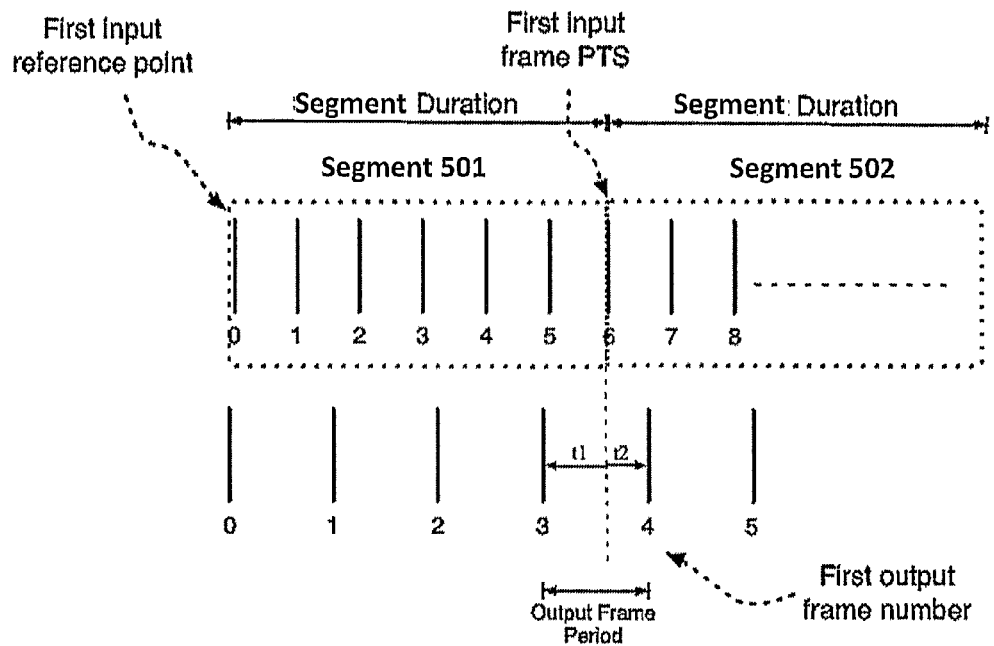
FIG. 5A is a schematic diagram illustrating one embodiment of input segments at an given input rate that is converted to a desired output frame rate.

FIG. 5A shows an example of a stream with multiple segments. Assume as above that the segment 501 will be sent to transcoding resource 401 in FIG. 4 for conversion, and that segment 502 will be sent to transcoding resource 402 for conversion. In this embodiment, the management machine 400 will provide each transcoding resource 401-402 with information used to determine how many output frames must be created in each output segment, and to determine offsets t1 and t2 for the given segment so as to be able to create an output frame with the proper t1 and t2. (The parameter t1 is referred to below as the end-of-segment offset time, and t2 is referred to as the start-of-segment offset time.)

To that end, preferably the transcoding management machine 400 determines and sends, for a given segment to be transcoded:

A reference point, such as the presentation time stamp of the initial input frame of the video to be transcoded. The reference point could also be time stamp for a hypothetical input frame appearing at an arbitrary time prior to the first input frame, if the presentation for the first input frame is not easily determinable. It should be understood that references to time stamps, presentation time stamps and the like, are typically with reference to a program clock reference (PCR) or system clock reference (SCR), such as is known in the art in streaming formats such as MPEG.

A time stamp, preferably the presentation time stamp, associated with the initial frame from the 'next' segment—that is, the segment in the stream that immediately follows the segment that a given transcoding resource will be assigned and will be sent. Put another way, the presentation time stamp for the 'next' frame in the video following the assigned segment is determined and sent. Preferably the management machine extracts the time stamp from the 'next' segment and sends it to the assigned transcoding resource. In this way, the management machine does not have to send the actual 'next' segment to the transcoding resource. Alternatively, the management machine could send the actual 'next' segment, but this results in excess data transmission and in excess processing for the assigned transcoding resource.

One way to obtain this presentation time stamp of the 'next' segment is for the management machine to use a function that performs fast parsing of the video headers to determine any necessary reordering of frames from decoding order to presentation order without actually decoding the video content of the frame. This functionality can be achieved through modification of known software packages, such as FFmpeg, to avoid decoding of frames. Alternatively, the management machine could perform the decode, though this would consume more resources.

Another way to obtain this presentation time stamp is to extract it from containers that encapsulate both the decode timestamp as well as the presentation timestamp for each video frame. In the case of such containers, a lookahead operation may be performed to select the lowest presentation timestamp amongst a sequence of video frames (for example, 16 video frames) and choose that as the initial time stamp of the next segment.

Figure 5B:
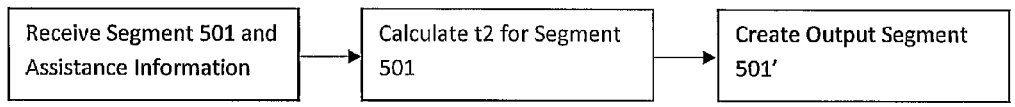
FIG. 5B is a flow diagram illustrating an embodiment of a frame-rate conversion workflow at each transcoding resource.
Figure 5B:
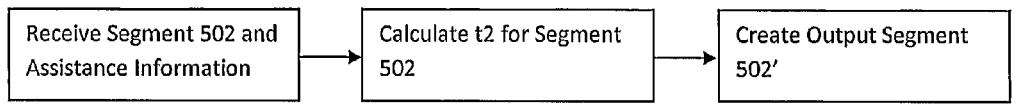

With reference to FIGS. 4-5, assume transcoding resource 401 will receive segment 501. For segment 501, the reference point can be the presentation time stamp of the first input frame (frame 0, which is from the same segment because it is the first segment), and the presentation time stamp associated with the initial frame from the 'next' segment would be the initial frame of segment 502 (frame 4). Transcoding resource 402 will receive segment 502, and for segment 502, the reference point can likewise be the presentation time stamp of the first input frame (frame 0), and the presentation time stamp associated with the initial frame from the 'next' segment would be the initial frame of segment 503 (not shown but immediately following segment 502 on the right).

The transcoding resources 401, 402 each use the assistance information they receive to independently calculate several parameters in constructing an output segment.

A transcoding resource can use the reference point to calculate the whole number of output frames that would fit into a duration that preceded the particular input segment at hand. From this, the start-of-segment offset time t2 can be determined for that given segment.

The first step is determining the total input duration D, which is determined by:

$$D(n) = \text{input\_segment\_start}(n) - \text{reference\_point}$$

where the input_segment_start(n) is the time marking the beginning of the current segment 'n' (e.g., the PCR time marking the beginning of the current segment). Preferably the segments are split as shown in FIG. 5A, such that the beginning of a segment is marked by an input frame, and therefore the time marking the beginning of the current segment is the presentation time stamp (PTS) of the initial frame;

where the reference_point is the reference point described above (e.g., the input PTS of the very first frame in the stream, or otherwise); and wherein 'n' is the segment being converted at the transcoding resource (e.g., segment 501 or 502, as the case may be).

Figure 6:
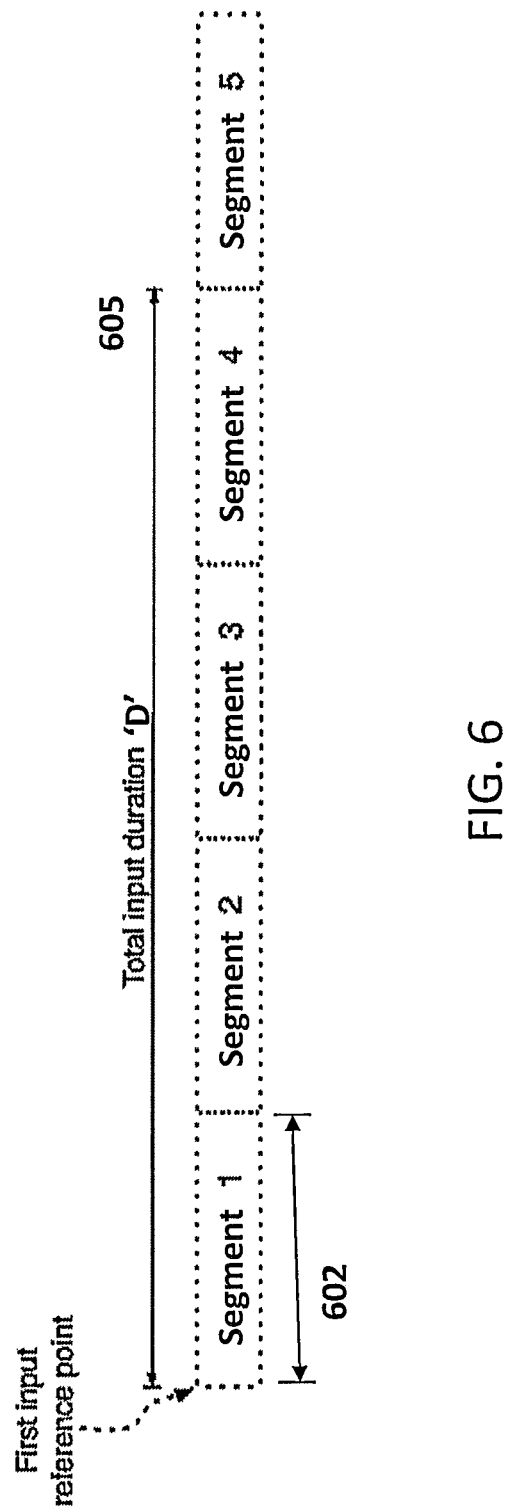
FIG. 6 is a schematic diagram illustrating one embodiment of a sequence of segments for demonstrating the calculation of an input duration.

FIG. 6 illustrates the concept of the total input duration D in two different cases. The total input duration D is calculated with reference to the segment 'n' that is being converted. The total input duration for segment 501 will be zero, as it is the first segment. Bracket 602 indicates the total input duration for segment 502. Bracket 605 indicates the total input duration for segment 505, solely as another example.

Another way of conceptualizing the total input duration D is that it represents the entire duration from the reference point (typically the beginning of the video) that preceded the segment 'n' that is being converted at the transcoding resource.

Next, the start-of-segment offset time t2 can be determined as follows:

$$\text{OFN}(n) = \text{ceiling}[D(n)/\text{OFP}]$$

where OFN is the output frame number for the initial frame in segment 'n' that is being converted;

where OFP is the desired output frame period that was specified by the transcoding management machine;

where the ceiling function operates to round any fractional result of the division of D/OFP to the next higher whole number; and $$t2 = [(\text{OFN}(n)) * \text{OFP}] - D(n)$$

Once obtained, the value of t2 may be added to the starting time of the output frame, which is calculated based on input_segment_start(n) as was shown above:

$$\text{output\_segment\_start}(n) = \text{input\_segment\_start}(n) + t2$$

where output_segment_start(n) is the starting time for the first frame of segment 'n'

It is worth noting that the calculation of t2 also can be made for the initial segment, which is the reason why the reference point could be an arbitrary time in the past. If the reference point actually coincides with the presentation time stamp of the initial frame of the initial input segment, then the value of t2 will be zero. If the value of the reference point is an arbitrary point in the past, then the value of t2 for the first segment may be a positive value.

Hence, in FIG. 5A, the output frame number of segment 502's initial frame is 4, and from this the value of t2 can be calculated. (For segment 501, the output frame number will be 1 and the value of t2 will be zero, as would be expected given that it is the initial segment and the reference point coincides with the presentation time stamp of the initial frame.)

As can be seen in FIG. 5A, the end-of-segment-offset-time t1 and start-of-segment offset time t2 together sum to one output frame period.

In an alternate embodiment, the transcoding management machine 400 might perform some or all of the above calculations and determinations itself, and send the result to the assigned transcoding resource along with the assigned segment. This approach, however, does not leverage the computing resources of the transcoding resources as much. Nevertheless, it may be suitable in certain implementations.

Each transcoding resource, after determining or receiving the results of the foregoing calculations with respect to its assigned input segment, can create an output segment with a proper start-of-segment offset time t2 and an appropriate number of output frames in compliance with the desired output frame rate. (See FIG. 5B.)

Figure 7:
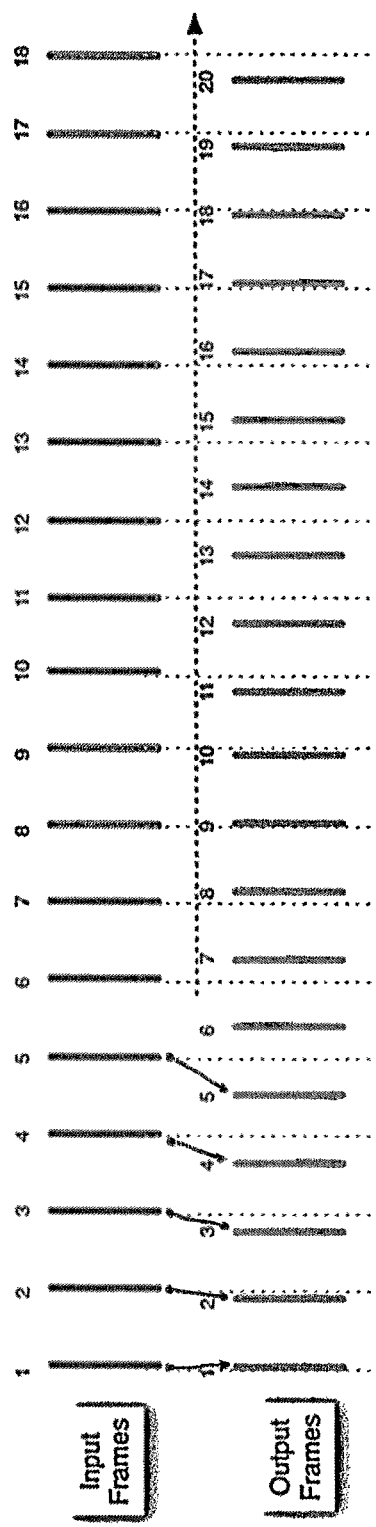
FIG. 7 is a schematic diagram illustrating one embodiment of frame-rate up-conversion.
Figure 8:
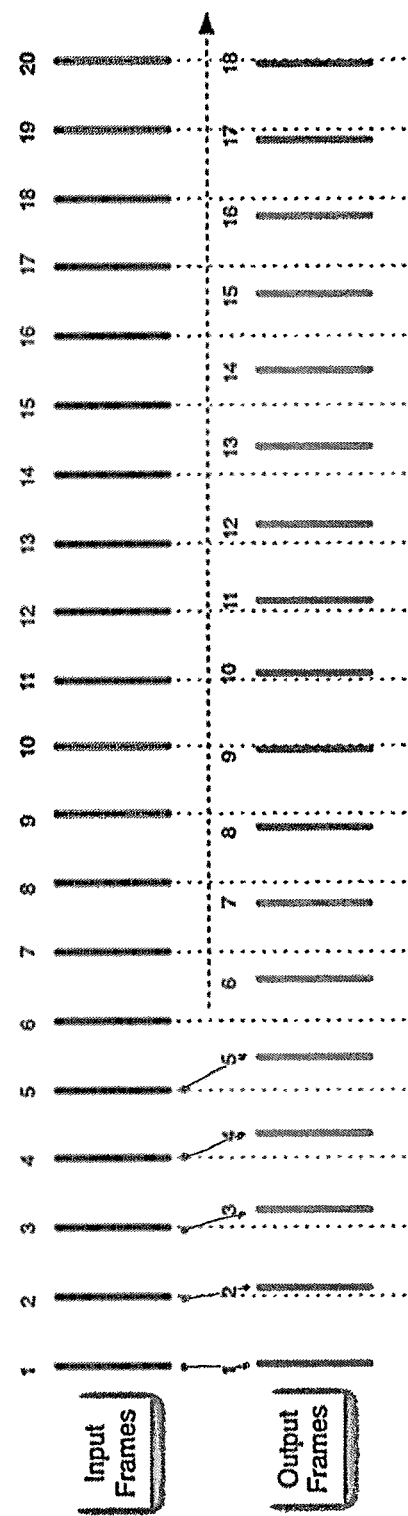
FIG. 8 is a schematic diagram illustrating one embodiment of frame-rate down-conversion.

A variety of approaches are known in the art for performing a frame-rate conversion and can be used in conjunction with the teachings hereof. Frame-rate conversion can be achieved through the duplication or elimination of frames from the input sequence for frames to match the desired frame-rate of the output sequence, for example. Some video processing techniques aim to avoid duplication/dropping of frames through the synthesis of missing or duplicated frames. FIGS. 7-8 are demonstrations of a frame-rate conversion process using the frame drop/duplication process, FIG. 7 being the up-conversion and FIG. 8 being the down-conversion.

Figure 9:
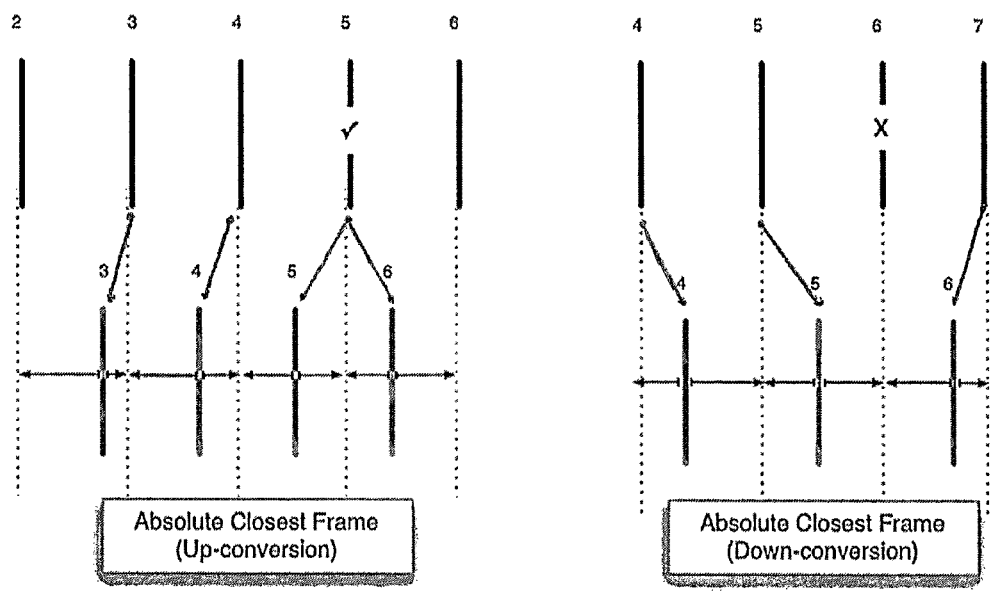
FIG. 9 is a schematic diagram illustrating one embodiment of a frame-rate conversion approach.
Figure 10:
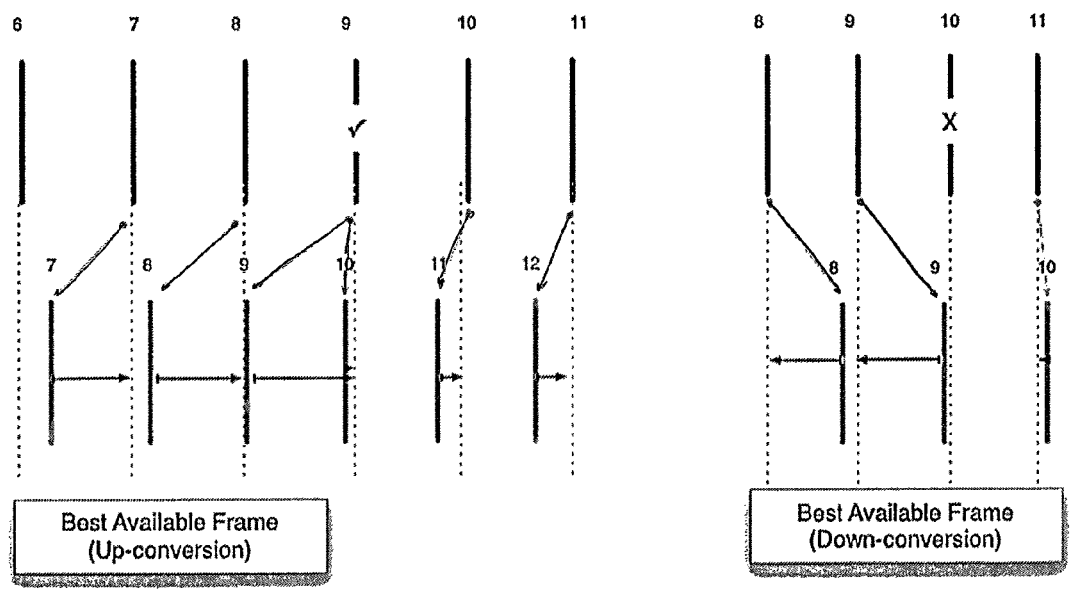
FIG. 10 is a schematic diagram illustrating another embodiment of a frame-rate conversion approach.

FIGS. 9-10 illustrate two possible methods two possible methods utilizing the frame dropping and duplication approach: 1) absolute closest possible decoded frame, and 2) best available decoded frame. In the closest possible frame approach (FIG. 9), whether for up-conversion or down-conversion, for each frame to be encoded, the absolute closest decoded frame must be selected for use by the duplication/dropping algorithm; as shown in FIG. 9, this approach requires that for every frame to be encoded, two input frames (before and after) be available, such that the absolute closest frame can be successfully determined.

The best-available approach (FIG. 10) utilizes the best available decoded frame. Here, each time a frame is decoded, it is examined to see whether it can be used for an output frame with a +/−1 frame distance in the past (duplicating) or the future (dropping).

A variety of software packages such as FFmpeg can be used for frame rate conversion (as modified by the teachings hereof).

The offset time t2, calculated as explained previously, is used into the frame-rate conversion process. For example, in FIG. 8, t2 is presented as zero because the first input and output frames are aligned. However, if t2 were positive, the first output frame would be shifted to the right by the value of t2. If t2 were negative, then the first output frame would be shifted left (before the input frame) by the value of t2.

Handling Input Jitter

As mentioned above, input frames may exhibit jitter in their timing. As described below, such jitter can be handled and reduced or removed during the frame rate conversion process.

Figure 11:
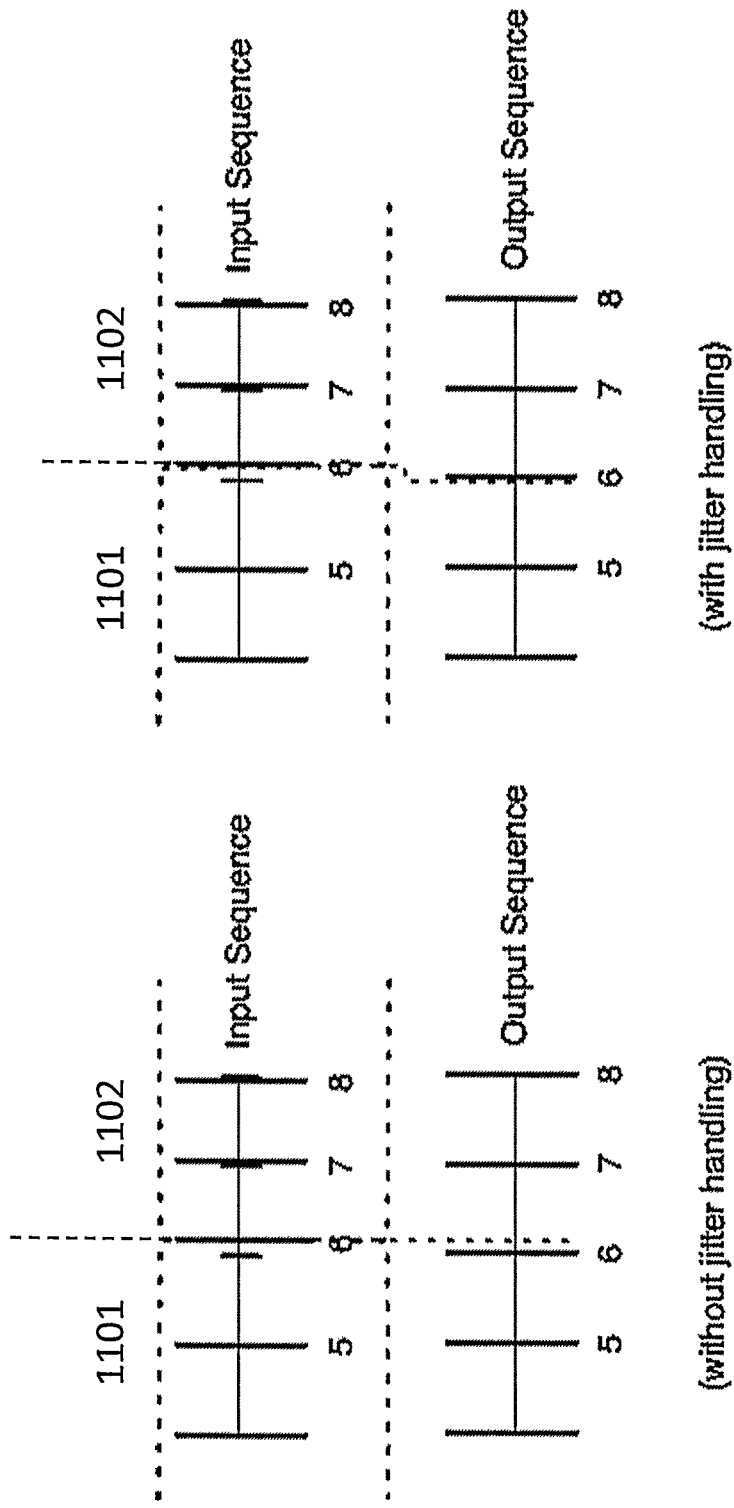
FIG. 11 is a schematic diagram illustrating one embodiment of a jitter handling technique.

Sometimes, even though an output frame falls within the boundary of an output segment being produced by a transcoding resource, it is desirable that the output frame be considered part of the next segment. An example is shown in FIG. 11, which depicts jitter at the boundary between segments 1101 and 1102. With reference to the left-hand side of FIG. 11 (no jitter handling), it is observed that though frame 6 of the output sequence falls within the boundary of an earlier segment 1101, it preferably should be created as part of the later segment 1102, because the placement of frame 6 is due to input noise rather than an actual frame-rate conversion. Placing this frame in the next segment would eliminate an unnecessary duplication and dropping at the segment boundary. To remedy this issue, the steps outlined in the following paragraphs may be taken:

If the first output frame of the next segment falls within a configured error tolerance, then the ceiling calculation described previously in paragraph 0 is adjusted to indicate one less output frame. In such a case, the output frame is created by the next streamlet. In order to achieve this, the formula for determining OFN(n) from the paragraph above may be altered to account for an error tolerance epsilon:

$$OFN(n)=\text{ceiling}[D(n)/OFP-EPSILON]$$

where EPSILON may be a predetermined constant factor between 0 to 0.5 depending on the desired error tolerance. An example value of 0.03 may be one such constant value. A value of zero, for example, indicates no tolerance for jitter in the input video timestamps, while a value above 0 and less than 0.5 indicates some level of tolerance for jitter in the input video timestamps. Alternatively, EPSILON may also be derived as a formula based on a maximum allowed jitter for a particular input source.

Figure 12:
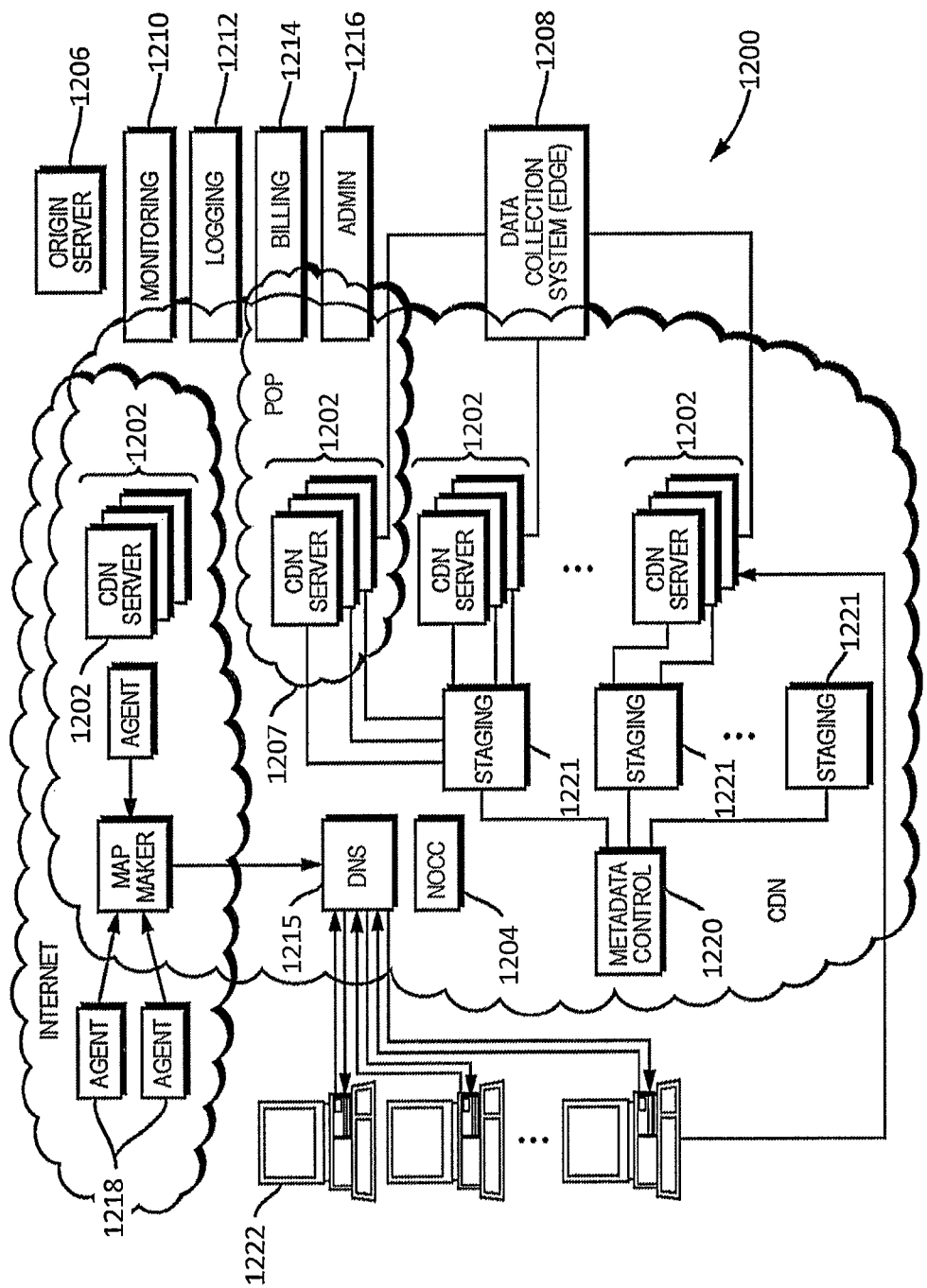
FIG. 12 is a schematic diagram illustrating one embodiment of a distributed computer system configured as a content delivery network (CDN)

Likewise, if the last output frame of the current segment falls within a configured error tolerance, then the transcoding resource processing that segment will not create that output frame, but rather expect that the next transcoding segment will create that frame Implementation Within CDN As noted above, the teachings hereof may be implemented within a content delivery network (CDN) and in particular the transcoding resource may be machines in the CDN that are shared between the transcoding function and other CDN function (such as content caching and delivery). FIG. 12 illustrates a distributed computer system configured CDN that is operated and managed by a service provider. The service provider typically provides the content delivery service on behalf of third parties. In a system such as that shown in FIG. 12, a distributed computer system 1200 is configured as a content delivery network (CDN) and has a set of machines 1202 distributed around the Internet. Typically, most of the machines are servers located near the edge of the Internet, i.e., at or adjacent end user access networks. A network operations command center (NOCC) 1204 may be used to administer and manage operations of the various machines in the system. Third party sites affiliated with content providers, such as web site 1206, offload delivery of content (e.g., HTML or other markup language files, embedded page objects, streaming media, software downloads, and the like) to the distributed computer system 1200 and, in particular, to the CDN servers. Such servers may be grouped together into a point of presence (POP) 1207 at a particular geographic location.

Typically, content providers offload their content delivery by aliasing (e.g., by a DNS CNAME) given content provider domains or sub-domains to domains that are managed by the service provider's authoritative domain name service. The server provider's domain name service directs end user client machines 1222 that desire content to the distributed computer system (or more particularly, to one of the CDN servers in the platform) to obtain the content more reliably and efficiently. The CDN servers respond to the client requests, for example by fetching requested content from a local cache, from another CDN server, from the origin server 1206 associated with the content provider, or other source.

For cacheable content, CDN servers typically employ on a caching model that relies on setting a time-to-live (TTL) for each cacheable object. After it is fetched, the object may be stored locally at a given CDN server until the TTL expires, at which time is typically re-validated or refreshed from the origin server 106. For non-cacheable objects (sometimes referred to as 'dynamic' content), the CDN server typically must return to the origin server 106 when the object is requested by a client.

Although not shown in detail in FIG. 12, the distributed computer system may also include other infrastructure, such as a distributed data collection system 1208 that collects usage and other data from the CDN servers, aggregates that data across a region or set of regions, and passes that data to other back-end systems 1210, 1212, 1214 and 1216 to facilitate monitoring, logging, alerts, billing, management and other operational and administrative functions. Distributed network agents 1218 monitor the network as well as the server loads and provide network, traffic and load data to a DNS query handling mechanism 1215. A distributed data transport mechanism 1220 may be used to distribute control information (e.g., metadata to manage content, to facilitate load balancing, and the like) to the CDN servers.

Figure 13:
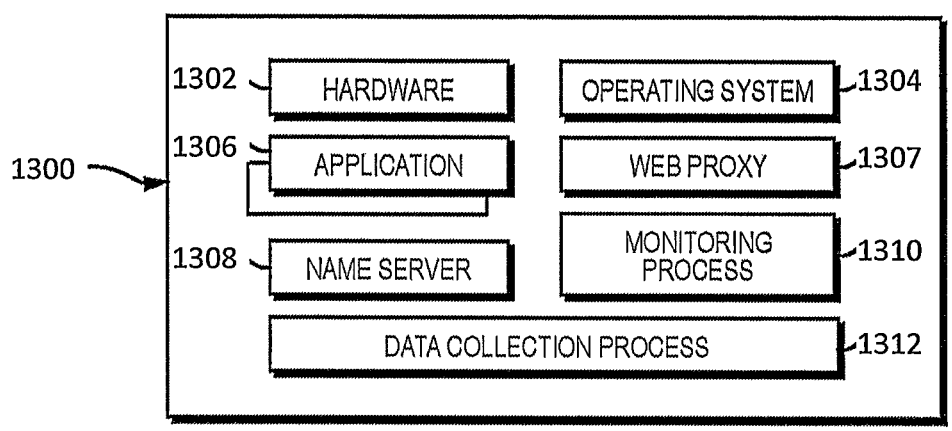
FIG. 13 is a schematic diagram illustrating one embodiment of a machine in the system of FIG. 12; and, FIG. 14 is a block diagram illustrating hardware in a computer system that may be used to implement the teachings hereof.

As illustrated in FIG. 13, a given machine 1300 in the CDN comprises commodity hardware (e.g., a microprocessor) 1302 running an operating system kernel (such as Linux® or variant) 1304 that supports one or more applications 1306. To facilitate content delivery services, for example, given machines typically run a set of applications, such as an HTTP proxy 1307, a name server 1308, a local monitoring process 1310, a distributed data collection process 1312, and the like. The HTTP proxy 1307 (sometimes referred to herein as a global host or "ghost") typically includes a manager process for managing a cache and delivery of content from the machine. For streaming media, the machine may include one or more media servers, as required by the supported media formats.

More information about a CDN platform can be found in U.S. Pat. Nos. 6,108,703, 7,596,619, 7,240,100, 7,111,057, the teachings of which are hereby incorporated by reference in their entirety. For live streaming delivery, the CDN may include a live delivery subsystem, such as described in U.S. Pat. No. 7,296,082, and U.S. Publication Nos. 2011/0173345 and 2012/0265853, the disclosures of which are incorporated herein by reference.

Computer Based Implementation

The subject matter described herein may be implemented in conventional computer systems, as modified by the teachings hereof, with the processes and functional characteristics described above realized in special-purpose hardware, general-purpose hardware configured by software stored therein for special purposes, or a combination thereof.

Software may include one or several discrete programs. A given function may comprise part of any given module, process, execution thread, or other such programming construct. Generalizing, each function described above may be implemented as computer code, namely, as a set of computer instructions, executable in one or more microprocessors to provide a special purpose machine. The code may be executed using conventional apparatus—such as a microprocessor in a computer, digital data processing device, or other computing apparatus—as modified by the teachings hereof. In one embodiment, such software may be implemented in a programming language that runs in conjunction with a proxy on a standard Intel hardware platform running an operating system such as Linux. The functionality may be built into the proxy code, or it may be executed as an adjunct to that code.

While in some cases above a particular order of operations performed by certain embodiments is set forth, it should be understood that such order is exemplary and that they may be performed in a different order, combined, or the like. Moreover, some of the functions may be combined or shared in given instructions, program sequences, code portions, and the like. References in the specification to a given embodiment indicate that the embodiment described may include a particular feature, structure, or characteristic, but every embodiment may not necessarily include the particular feature, structure, or characteristic.

Figure 14:
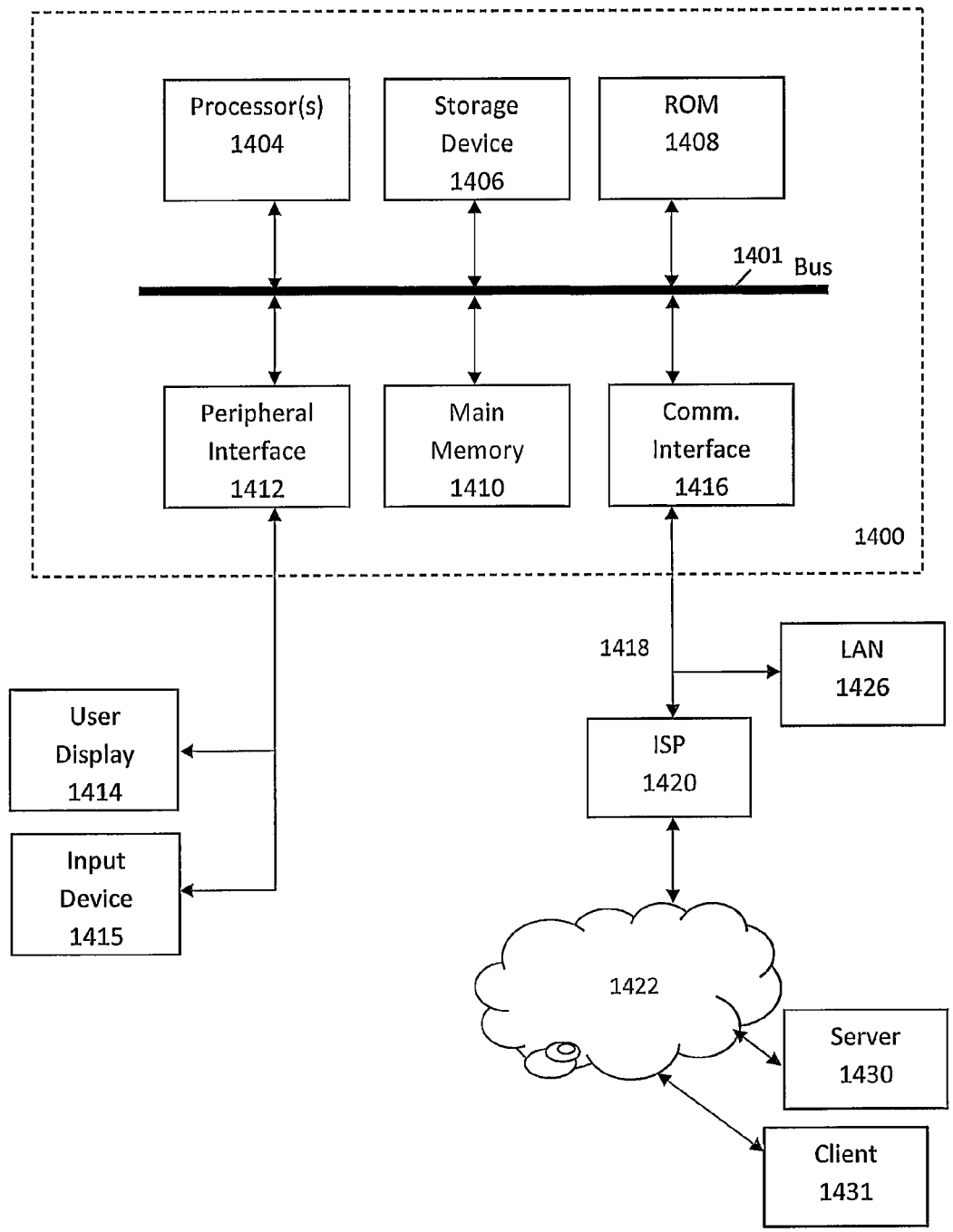

FIG. 14 is a block diagram that illustrates hardware in a computer system 1400 in which embodiments of the invention may be implemented. The computer system 1400 may be embodied in a client, server, personal computer, workstation, tablet computer, wireless device, mobile device, network device, router, hub, gateway, or other device.

Computer system 1400 includes a microprocessor 1404 coupled to bus 1401. In some systems, multiple microprocessor and/or microprocessor cores may be employed. Computer system 1400 further includes a main memory 1410, such as a random access memory (RAM) or other storage device, coupled to the bus 1401 for storing information and instructions to be executed by microprocessor 1404. A read only memory (ROM) 1408 is coupled to the bus 1401 for storing information and instructions for microprocessor 1404. As another form of memory, a non-volatile storage device 1406, such as a magnetic disk, solid state memory (e.g., flash memory), or optical disk, is provided and coupled to bus 1401 for storing information and instructions. Other application-specific integrated circuits (ASICs), field programmable gate arrays (FPGAs) or circuitry may be included in the computer system 1400 to perform functions described herein.

Although the computer system 1400 is often managed remotely via a communication interface 1416, for local administration purposes the system 1400 may have a peripheral interface 1412 communicatively couples computer system 1400 to a user display 1414 that displays the output of software executing on the computer system, and an input device 1415 (e.g., a keyboard, mouse, trackpad, touchscreen) that communicates user input and instructions to the computer system 1400. The peripheral interface 1412 may include interface circuitry and logic for local buses such as Universal Serial Bus (USB) or other communication links.

Computer system 1400 is coupled to a communication interface 1416 that provides a link between the system bus 1401 and an external communication link. The communication interface 1416 provides a network link 1418. The communication interface 1416 may represent an Ethernet or other network interface card (NIC), a wireless interface, modem, an optical interface, or other kind of input/output interface.

Network link 1418 provides data communication through one or more networks to other devices. Such devices include other computer systems that are part of a local area network (LAN) 1426. Furthermore, the network link 1418 provides a link, via an internet service provider (ISP) 1420, to the Internet 1422. In turn, the Internet 1422 may provide a link to other computing systems such as a remote server 1430 and/or a remote client 1431. Network link 1418 and such networks may transmit data using packet-switched, circuit-switched, or other data-transmission approaches.

In operation, the computer system 1400 may implement the functionality described herein as a result of the microprocessor executing code. Such code may be read from or stored on a non-transitory computer-readable medium, such as memory 1410, ROM 1408, or storage device 1406. Other forms of non-transitory computer-readable media include disks, tapes, magnetic media, CD-ROMs, optical media, RAM, PROM, EPROM, and EEPROM. Any other non-transitory computer-readable medium may be employed. Executing code may also be read from network link 1418 (e.g., following storage in an interface buffer, local memory, or other circuitry).

The client device may be a conventional desktop, laptop or other Internet-accessible machine running a web browser or other rendering engine, but as mentioned above the client may also be a wireless device.

It should be understood that the foregoing has presented certain embodiments of the invention that should not be construed as limiting. For example, certain language, syntax, and instructions have been presented above for illustrative purposes, and they should not be construed as limiting. It is contemplated that those skilled in the art will recognize other possible implementations in view of this disclosure and in accordance with its scope and spirit. The appended claims define the subject matter for which protection is sought.

It is noted that trademarks appearing herein are the property of their respective owners and used for identification and descriptive purposes only, given the nature of the subject matter at issue, and not to imply endorsement or affiliation in any way.

The invention claimed is:

1. A system for frame-rate conversion in a distributed computing system, comprising:
   each of a management machine and a first and a second transcoding resource machines comprising at least one microprocessor that is coupled to memory storing code executable by the at least one microprocessor to operate the given machine as described herein;
   the management machine storing code in memory executable to send first and second segments and to the first and second transcoding resource machines, respectively, wherein each of the first and second segments represent portions of a video that are distinct from one another;
   wherein the management machine further stores code in memory executable to send an instruction to the first transcoding resource machine to convert a frame rate of the portion of the video represented by the first segment to an output frame rate, and send an instruction to the second transcoding resource machine to convert a frame rate of the portion of the video represented by the second segment to the output frame rate;
   wherein the management machine further stores code in memory executable to send to the first transcoding resource machine:
      (i) a first time stamp that represents a reference point in the video;
      (ii) a second time stamp that is associated with the initial frame of a segment of the video immediately following the first segment;
   wherein the first transcoding resource machine stores code in memory executable to create an output segment at the output frame rate from the first segment, the output segment having an output frame period (OFP) that corresponds to the output frame rate specified in the instruction from the management machine, an output frame number (OFN) for the initial frame in the output segment, and a start-of-segment offset time (t2), where the values of OFN, and t2 are:

$$OFN = \text{ceiling}(D/OFP)$$

where D is the time difference between the beginning of the first segment and the first time stamp, and the ceiling function operates to round any fractional result of the division of D/OFP to the next higher whole number;

$$t2 = [(OFN)*OFP] - D.$$

2. The system of claim 1, wherein the first time stamp is a presentation time stamp for the initial frame of the video.

3. The system of claim 1, wherein the second time stamp is a presentation time stamp for the initial frame from the segment in the video immediately following the first segment.

4. The system of claim 1, wherein the management machine stores code in memory executable to extract the second time stamp from the initial frame of a segment in the video immediately following the first segment before sending the second time stamp to the first transcoding resource machine.

5. The system of claim 1, wherein the management machine further stores code in memory executable to send to the second transcoding resource machine:
   (i) the first time stamp; and
   (ii) a third time stamp that is associated with an initial frame from a segment in the video immediately following the second segment.

6. The system of claim 1, wherein the first transcoding resource machine stores code in memory executable to create an output segment at the output frame rate from the first segment, and sends the output segment to the management machine.

7. The system of claim 1, wherein the management machine stores code in memory executable to segment the video into a plurality of non-overlapping segments that include the first and second segments.

8. The system of claim 1, wherein other segments in the video precede the first and second segments.

9. A system for frame-rate conversion in a distributed computing system, comprising:
   each of a management machine and a first and a second transcoding resource machines comprising at least one microprocessor that is coupled to memory storing code executable by the at least one microprocessor to operate the given machine as described herein;
   the management machine storing code in memory executable to send first and second segments and to the first and second transcoding resource machines, respectively, wherein each of the first and second segments represent portions of a video that are distinct from one another;
   wherein the management machine further stores code in memory executable to send an instruction to the first transcoding resource machine to convert a frame rate of the portion of the video represented by the first segment to an output frame rate, and send an instruction to the second transcoding resource machine to convert a frame rate of the portion of the video represented by the second segment to the output frame rate;
   wherein the management machine further stores code in memory executable to send to the first transcoding resource machine:
      (i) a first time stamp that represents a reference point in the video;
      (ii) a second time stamp that is associated with the initial frame of a segment of the video immediately following the first segment;
   wherein the first transcoding resource machine stores code in memory executable to create an output segment at the output frame rate from the first segment, the output segment having an output frame period (OFP) that corresponds to the output frame rate specified in the instruction from the management machine, an output frame number (OFN) for the initial frame in the output segment, an error tolerance factor EPSILON, and a start-of-segment offset time (t2), where the values of OFN, and t2 are:

$$OFN = \text{ceiling}(D/OFP - EPSILON)$$

where D is the time difference between the beginning of the first segment and the first time stamp, EPSILON is an error tolerance factor, and the ceiling function operates to round any fractional result of the division of D/OFP to the next higher whole number;

$$t2 = [(OFN)*OFP] - D.$$

10. The system of claim 9, wherein the value of EPSILON is related to tolerance for jitter in time stamps of the video to be converted.

11. The system of claim 10, wherein the value of EPSILON is between 0 and 0.5.

12. The system of claim 9, wherein the value of EPSILON is determined based on expected jitter in the input video source.

13. The system of claim 9, wherein the first time stamp is a presentation time stamp for the initial frame of the video.

14. The system of claim 9, wherein the second time stamp is a presentation time stamp for the initial frame from the segment in the video immediately following the first segment.

15. The system of claim 9, wherein the management machine stores code in memory executable to extract the second time stamp from the initial frame of a segment in the video immediately following the first segment before sending the second time stamp to the first transcoding resource machine.

16. The system of claim 9, wherein the management machine further stores code in memory executable to send to the second transcoding resource machine:
 (i) the first time stamp; and
 (ii) a third time stamp that is associated with an initial frame from a segment in the video immediately following the second segment.

17. The system of claim 9, wherein the first transcoding resource machine stores code in memory executable to create an output segment at the output frame rate from the first segment, and sends the output segment to the management machine.

18. The system of claim 9, wherein the management machine stores code in memory executable to segment the video into a plurality of non-overlapping segments that include the first and second segments.

19. The system of claim 9, wherein other segments in the video precede the first and second segments.

20. A method of temporal transcoding, comprising:
at a management machine:
 sending first and second segments and to first and second transcoding resource machines, respectively, wherein each of the first and second segments represent portions of a video that are distinct from one another;
 sending an instruction to the first transcoding resource machine to convert a frame rate of the portion of the video represented by the first segment to an output frame rate, and sends an instruction to the second transcoding resource machine to convert a frame rate of the portion of the video represented by the second segment to the output frame rate;
 sending to the first transcoding resource machine:
  (i) a first time stamp that represents a reference point in the video;
  (ii) a second time stamp that is associated with the initial frame of a segment of the video immediately following the first segment;
at the first transcoding resource machine, creating an output segment at the output frame rate from the first segment, the output segment having an output frame period (OFP) that corresponds to the specified output frame rate specified in the instruction sent to the first transcoding resource, an output frame number (OFN) for the initial frame in the output segment, and a start-of-segment offset time (t2), where the values of OFN, and t2 are:

$$OFN = \text{ceiling}(D/OFP)$$

where D is the time difference between the beginning of the first segment and the first time stamp, and the ceiling function operates to round any fractional result of the division of D/OFP to the next higher whole number;

$$t2 = [(OFN)*OFP] - D.$$

21. The method of claim 20, wherein the first time stamp is a presentation time stamp for the initial frame of the video.

22. The method of claim 20, wherein the second time stamp is a presentation time stamp for the initial frame from the segment in the video immediately following the first segment.

23. The method of claim 20, further comprising extracting the second time stamp from the initial frame of a segment in the video immediately following the first segment before sending the second time stamp to the first transcoding resource machine.

24. The method of claim 20, further comprising sending to the second transcoding resource machine:
 (i) the first time stamp; and
 (ii) a third time stamp that is associated with an initial frame from a segment in the video immediately following the second segment.

25. A method of temporal transcoding, comprising:
at a management machine:
 sending first and second segments and to first and second transcoding resource machines, respectively, wherein each of the first and second segments represent portions of a video that are distinct from one another;
 sending an instruction to the first transcoding resource machine to convert a frame rate of the portion of the video represented by the first segment to an output frame rate, and sends an instruction to the second transcoding resource machine to convert a frame rate of the portion of the video represented by the second segment to the output frame rate;
 sending to the first transcoding resource machine:
  (i) a first time stamp that represents a reference point in the video;
  (ii) a second time stamp that is associated with the initial frame of a segment of the video immediately following the first segment;
at the first transcoding resource machine, creating an output segment at the output frame rate from the first segment, the output segment having an output frame period (OFP) that corresponds to the output frame rate specified in the instruction sent to the first transcoding resource, an output frame number (OFN) for the initial frame in the output segment, an error tolerance factor EPSILON, and a start-of-segment offset time (t2), where the values of OFN, and t2 are:

$$OFN = \text{ceiling}(D/OFP - EPSILON)$$

where D is the time difference between the beginning of the first segment and the first time stamp, EPSILON is an error tolerance factor, and the ceiling function operates to round any fractional result of the division of D/OFP to the next higher whole number;

$$t2 = [(OFN)*OFP] - D.$$

26. The method of claim 25, wherein the value of EPSILON is related to tolerance for jitter in time stamps of the video to be converted.

27. The method of claim 26, wherein the value of EPSILON is between 0 and 0.5.

28. The method of claim 25, wherein the value of EPSILON is determined based on expected jitter in the input video source.

29. The method of claim 25, wherein other segments in the video precede the first and second segments.

30. A non-transitory computer readable storage medium, storing one or more programs for execution by one or more processors of computer apparatuses, wherein the one or more programs include instructions for:
  at a management machine:
    sending first and second segments and to first and second transcoding resource machines, respectively, wherein each of the first and second segments represent portions of a video that are distinct from one another;
    sending an instruction to the first transcoding resource machine to convert a frame rate of the portion of the video represented by the first segment to an output frame rate, and sends an instruction to the second transcoding resource machine to convert a frame rate of the portion of the video represented by the second segment to the output frame rate;
    sending to the first transcoding resource machine:
      (i) a first time stamp that represents a reference point in the video;
      (ii) a second time stamp that is associated with the initial frame of a segment of the video immediately following the first segment; and
  at the first transcoding resource machine:
    creating an output segment at the output frame rate from the first segment, the output segment having an output frame period (OFP) that corresponds to the specified output frame rate specified in the instruction sent to the first transcoding resource, an output frame number (OFN) for the initial frame in the output segment, and a start-of-segment offset time (t2), where the values of OFN, and t2 are:

$OFN = \text{ceiling}(D/OFP)$ where D is the time difference between the beginning of the first segment and the first time stamp, and the ceiling function operates to round any fractional result of the division of D/OFP to the next higher whole number;

$t2 = [(OFN)*OFP] - D.$

31. Non-transitory computer readable storage mediums, storing one or more programs for execution by one or more processors of computer apparatuses, wherein the one or more programs include instructions for:
  at a management machine:
    sending first and second segments and to first and second transcoding resource machines, respectively, wherein each of the first and second segments represent portions of a video that are distinct from one another;
    sending an instruction to the first transcoding resource machine to convert a frame rate of the portion of the video represented by the first segment to an output frame rate, and sends an instruction to the second transcoding resource machine to convert a frame rate of the portion of the video represented by the second segment to the output frame rate;
    sending to the first transcoding resource machine:
      (i) a first time stamp that represents a reference point in the video;
      (ii) a second time stamp that is associated with the initial frame of a segment of the video immediately following the first segment; and
  at the first transcoding resource machine:
    creating an output segment at the output frame rate from the first segment, the output segment having an output frame period (OFP) that corresponds to the output frame rate specified in the instruction sent to the first transcoding resource, an output frame number (OFN) for the initial frame in the output segment, an error tolerance factor EPSILON, and a start-of-segment offset time (t2), where the values of OFN, and t2 are:

$OFN = \text{ceiling}(D/OFP - EPSILON)$ where D is the time difference between the beginning of the first segment and the first time stamp, EPSILON is an error tolerance factor, and the ceiling function operates to round any fractional result of the division of D/OFP to the next higher whole number;

$t2 = [(OFN)*OFP] - D.$

* * * * *